US011588852B2

(12) United States Patent
Watters et al.

(10) Patent No.: US 11,588,852 B2
(45) Date of Patent: *Feb. 21, 2023

(54) VULNERABILITY VALIDATION USING ATTACK PAYLOADS

(71) Applicant: Rapid7, Inc., Boston, MA (US)

(72) Inventors: Brendan Watters, Dallas, TX (US); Brent Cook, Pflugerville, TX (US)

(73) Assignee: Rapid7, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/520,942

(22) Filed: Nov. 8, 2021

(65) Prior Publication Data

US 2022/0060505 A1 Feb. 24, 2022

Related U.S. Application Data

(63) Continuation of application No. 16/404,860, filed on May 7, 2019, now Pat. No. 11,201,896.

(51) Int. Cl.
*G06F 21/57* (2013.01)
*H04L 9/40* (2022.01)

(52) U.S. Cl.
CPC ........ *H04L 63/1466* (2013.01); *G06F 21/577* (2013.01); *H04L 63/1433* (2013.01)

(58) Field of Classification Search
CPC ............ H04L 63/1466; H04L 63/1433; G06F 21/577
See application file for complete search history.

(56) References Cited

U.S. PATENT DOCUMENTS

| 10,382,473 | B1 | 8/2019 | Ashkenazy |
| 10,740,471 | B2 * | 8/2020 | Hodgman ................ G06F 8/62 |
| 10,771,490 | B2 * | 9/2020 | Myers ................ H04L 63/1433 |
| 10,848,516 | B2 * | 11/2020 | Lin .................... H04L 63/1433 |
| 10,965,699 | B2 * | 3/2021 | Hodgman ........... H04L 63/1416 |
| 11,038,920 | B1 | 6/2021 | Sellers |
| 11,108,790 | B1 * | 8/2021 | Deardorff .............. G06F 21/53 |
| 11,113,405 | B2 * | 9/2021 | Hodgman ............... H04L 63/08 |
| 11,115,431 | B2 * | 9/2021 | Pagano ................. G06N 20/00 |
| 11,128,667 | B2 * | 9/2021 | Shivamoggi .......... G06F 21/577 |
| 11,290,479 | B2 * | 3/2022 | Hodgman ........... H04L 63/1433 |
| 11,418,528 | B2 * | 8/2022 | Deardorff .............. H04L 63/20 |
| 2011/0030057 | A1 * | 2/2011 | Chen .................. H04L 63/1416 726/25 |
| 2012/0311713 | A1 | 12/2012 | Amit et al. |
| 2014/0082734 | A1 | 3/2014 | Guarnieri et al. |
| 2014/0082735 | A1 * | 3/2014 | Beskrovny .......... H04L 63/1433 726/25 |
| 2014/0283052 | A1 | 9/2014 | Jordan et al. |
| 2015/0264082 | A1 | 9/2015 | Belva |

(Continued)

*Primary Examiner* — J. Brant Murphy
*Assistant Examiner* — Stephen T Gundry
(74) *Attorney, Agent, or Firm* — Ashwin Anand

(57) ABSTRACT

Disclosed herein are methods, systems, and processes for validating vulnerabilities using lightweight offensive payloads. An attack payload limited by an execution scope that includes pre-defined exploit features for validating code execution associated with a vulnerability is generated. The attack payload is transmitted to a target computing system and a confirmation of the code execution based on at least one pre-defined exploit feature is received, permitting a determination that the vulnerability has been validated.

20 Claims, 9 Drawing Sheets

(56) References Cited

U.S. PATENT DOCUMENTS

| | | |
|---|---|---|
| 2016/0110547 A1 | 4/2016 | Dawson |
| 2016/0149900 A1 | 5/2016 | Justin et al. |
| 2016/0285861 A1 | 9/2016 | Chester |
| 2016/0294793 A1* | 10/2016 | Larson ............... H04L 63/0853 |
| 2018/0089437 A1 | 3/2018 | Baset et al. |
| 2018/0239902 A1 | 8/2018 | Godard et al. |
| 2019/0238575 A1 | 8/2019 | Hodgman |
| 2019/0306198 A1 | 10/2019 | Feiertag et al. |
| 2019/0311130 A1 | 10/2019 | Hodgman et al. |
| 2019/0327263 A1 | 10/2019 | Jalio et al. |
| 2019/0370472 A1 | 12/2019 | Hodgman et al. |
| 2020/0053115 A1 | 2/2020 | Hodgman |
| 2020/0106798 A1 | 4/2020 | Lin |
| 2020/0112583 A1 | 4/2020 | Pagano et al. |
| 2020/0145413 A1 | 5/2020 | Brinckman et al. |
| 2020/0145446 A1 | 5/2020 | Deardorff et al. |
| 2020/0169576 A1 | 5/2020 | Myers |
| 2020/0175172 A1* | 6/2020 | Parsons ............. G06F 11/3604 |
| 2020/0177633 A1 | 6/2020 | Shivamoggi et al. |
| 2020/0220894 A1 | 7/2020 | Liu et al. |
| 2020/0242717 A1* | 7/2020 | Agarwal ............ G06F 16/9554 |
| 2020/0274894 A1* | 8/2020 | Argoeti .................. G06F 7/556 |
| 2020/0314135 A1* | 10/2020 | Kang .................... G06F 16/986 |
| 2021/0029156 A1 | 1/2021 | Sharifi Mehr |
| 2021/0044617 A1 | 2/2021 | Lekies et al. |
| 2021/0058412 A1 | 2/2021 | Rowland |
| 2021/0191880 A1* | 6/2021 | Ki ....................... G06F 12/1408 |
| 2021/0211466 A1* | 7/2021 | Sellers .................... H04L 63/20 |
| 2022/0197923 A1* | 6/2022 | Jeong .................... G06F 21/552 |

* cited by examiner

Vulnerability Validation Table 405

| Target Field 410 | Vulnerability Field 415 | Features Field 420 | Attack Payload Field 425 | UUID Field 430 |
|---|---|---|---|---|
| 135(1) | SQL Injection | 215(1)-(5) | 130(1) | 220(1) |
| 135(2) | Cross-Site Scripting | 215(1)-(3) | 130(2) | 220(2) |
| 135(3) | Insecure Direct Object References | 215(1)-(10) | 130(3) | 220(3) |
| 135(4) | Cross-Site Request Forgery | 215(5)-(15) | 130(4) | 220(4) |
| 135(5) | Insecure Cryptographic Storage | 215(1) | 130(5) | 220(5) |
| 135(6) | Failure to Restrict URL Access | 215(1)-(4) | 130(6) | 220(6) |
| 135(7) | Unvalidated Redirects & Forwards | 215(1)-(2) | 130(7) | 220(7) |
| ••• | ••• | ••• | ••• | ••• |

VULNERABILITY VALIDATION USING ATTACK PAYLOADS

This application is a continuation of U.S. patent application Ser. No. 16/404,860, filed May 7, 2019, now U.S. Pat. No. 11,201,896, issued on Dec. 14, 2021, which is hereby incorporated by reference herein its entirety.

BACKGROUND

This disclosure is related to cybersecurity computing systems. In particular, this disclosure is related to vulnerability validation using lightweight offensive payloads.

A vulnerability is a weakness of a computing system that can be exploited by a threat actor (e.g., an attacker) to perform unauthorized actions within the computing system. For example, a flaw or weakness in system security procedures, design, implementation, or internal controls of a computing system can be exploited resulting in a security breach. Vulnerability management refers to the process of identifying, classifying, prioritizing, remediating, and/or mitigating software vulnerabilities. For example, vulnerabilities can be discovered with a vulnerability scanner, which analyzes a computing system for known vulnerabilities, such as open ports, insecure software configurations, susceptibility to malware infections, and the like.

Vulnerability management solutions typically detect vulnerable computing systems by examining and/or analyzing currently installed software, network footprint and signatures, and static configurations (among other susceptible characteristics) of such computing systems. An exploit is a piece of software, chunk of data, or a sequence of commands that takes advantage of a given vulnerability to cause unintended or unanticipated behavior to occur on computer software and/or hardware. Such behavior can include gaining control of a computing system, allowing privilege escalation, a denial-of-service (DoS) attack or distributed denial-of-service (DDoS) attack, and the like. Executing a real exploit against a potentially vulnerable computing system (e.g., a protected host) can enable a determination that the protected host is (or is likely to be) vulnerable to the given exploit. Unfortunately, validating vulnerabilities using exploits in a controlled, efficient, and/or optimized manner that prevents security-related risks during the validation process presents a significant technology-related challenge.

SUMMARY

Disclosed herein are methods, systems, and processes for validating vulnerabilities using lightweight offensive payloads. One such method involves generating an attack payload limited by an execution scope that includes pre-defined exploit features for validating code execution associated with a vulnerability. The attack payload is transmitted to a target computing system and a confirmation of the code execution based on at least one pre-defined exploit feature is received, permitting a determination that the vulnerability has been validated.

In one embodiment, the attack payload is generated at a vulnerability validation server, and includes executable code and a universally unique identifier (UUID). In this example, the attack payload is configured to limit the execution scope of the executable code to the pre-defined exploit features and to transmit the confirmation of the code execution of the executable code to the vulnerability validation server. The confirmation includes the UUID and indicates that the code execution is based on at least one pre-defined exploit feature.

In some embodiments, the pre-defined exploit features perform an execution and cleanup operation including self-deletion or execution from memory, a selection and beaconing operation to enable secure validation that the attack payload has been executed, a conditional execution operation based on attributes of the target computing system to maintain the execution scope of the attack payload, a two-way integrity checking operation for cross-validation to prevent false-positives or man-in-the-middle attacks, and/or a two-way confidentiality operation that encrypts communications to prevent the false-positives or the man-in-the-middle attacks.

In other embodiments, the code execution ceases if discovery of the code execution is likely, no further exploit vectors associated with the vulnerability are provided, the code execution does not facilitate a bidirectional communication channel, and the attack payload is included in protocol-based communications.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

FIG. 4 is a block diagram 400 of a vulnerability validation table, according to one embodiment of the present disclosure.

Figure 1:
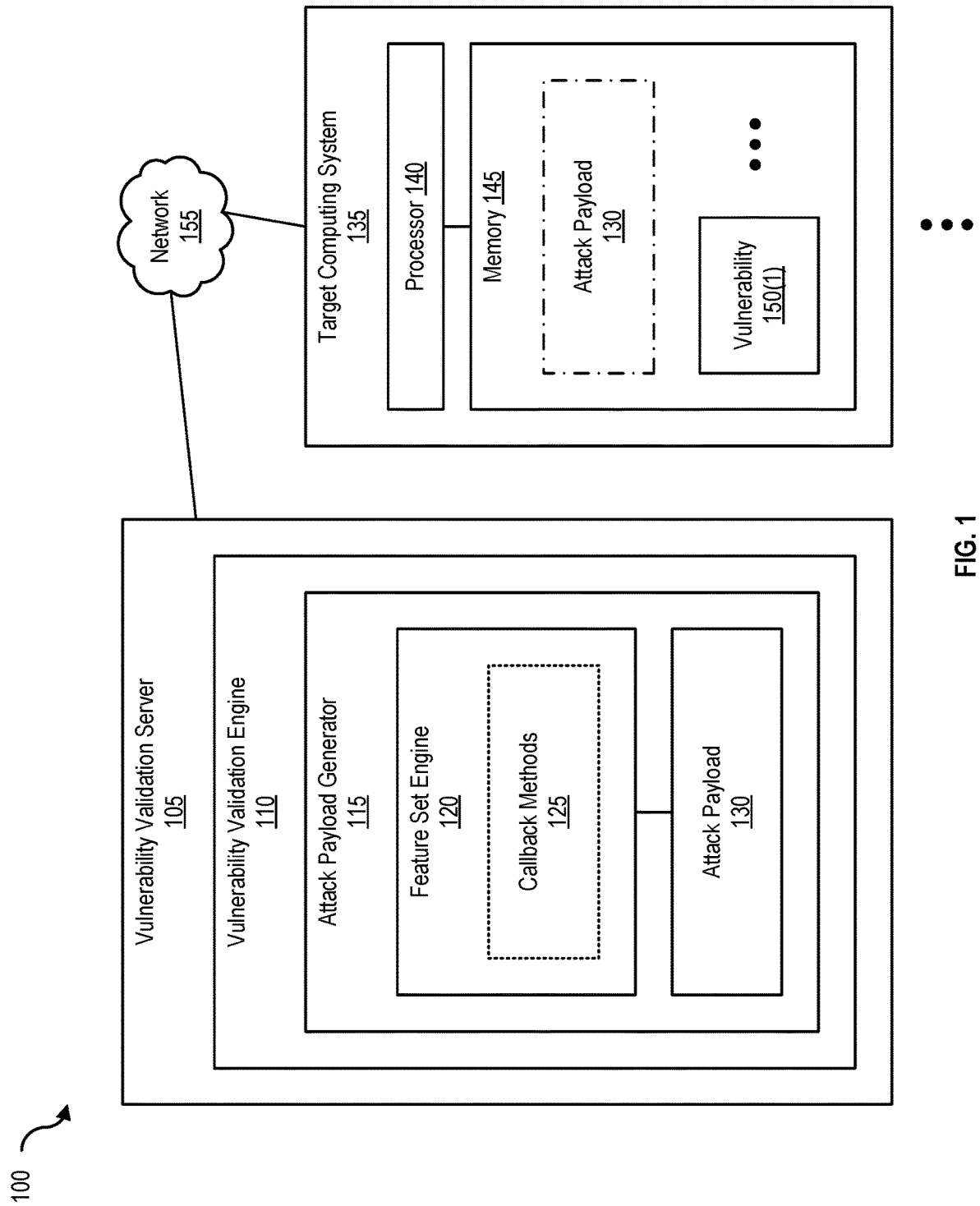
FIG. 1 is a block diagram 100 of a vulnerability validation server, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

In modern cybersecurity computing environments, vulnerability scanners can be deployed to assess a computer network for installed software and one or more vulnerabilities associated with the software (e.g., open ports, insecure software configurations, susceptibility to malware infections, and the like). However, vulnerability scanners do not indicate whether a given vulnerability poses a real risk to an organization. For example, redundancy in terms of the time and resources expended by information technology (IT) teams remediating vulnerabilities that do not pose a credible risk to the organization is inefficient and wasteful.

Vulnerability validation permits identification of critical risks by confirming whether a given vulnerability is exploitable (e.g., by malicious actors such as hackers, rogue governmental agencies, and the like) in the context of an organization's computing environment. As previously noted, existing vulnerability management solutions typically detect vulnerable computing systems by examining and/or analyzing currently installed software, network footprint and signatures, and static configuration(s). Unfortunately, the reporting of false-positives is a significant problem with existing vulnerability management solutions, where such false-positives are regrettably common if for example, the vulnerable or potentially vulnerable software is not configured or executing in a manner that can be leveraged by an attacker.

Real exploits can be run against a target computing system (e.g., a host) to verify and/or prove that the host is vulnerable (e.g., to one or more exploits). Unfortunately, conventional and existing offensive security measures introduce substantial security-related risks such as the introduction of instabilities, insecure bidirectional interactive communication channels, and the leaving behind of undesirable artifacts on the target computing system. Such artifacts, while useful in an offensive exercise, are not required to merely verify or validate that the target computing system is vulnerable or potentially vulnerable to a particular exploit.

Therefore, validating vulnerabilities using real and/or live exploits in a controlled, efficient, and/or optimized manner that prevents security-related risks during the validation process presents a significant technology-related challenge. Disclosed herein are methods, systems, and processes to validate vulnerabilities using a lightweight offensive payload.

Example Vulnerability Validation Server

FIG. 1 is a block diagram 100 of a vulnerability validation server 105, according to one embodiment. Vulnerability validation server 105, which can be any type of computing system or computing device (e.g., a physical computing device, a virtual machine, and the like) includes at least a vulnerability validation engine 110 with an attack payload generator 115. Attack payload generator 115 includes at least a feature set engine 120 with callback methods 125 and an attack payload 130 (e.g., referred to herein as a lightweight offensive payload). Vulnerability validation server 105 is communicatively coupled to a target computing system 135 (which like vulnerability validation server 105, can be any type of computing system or computing device) via a network 155 (which can be any type of network or interconnection).

Target computing system 135 includes at least a processor 140 and a memory 145. As shown in FIG. 1, attack payload 130 is transmitted by attack payload generator 115 from vulnerability validation server 105 to memory 145 (or any other type of volatile or non-volatile storage device) in target computing system 135 to verify, validate, or authenticate one or more vulnerabilities (e.g., a vulnerability 150(1)) using a real and/or live exploit that is part of attack payload 130. An example composition of attack payload 130 is discussed in greater detail with respect to FIG. 2, infra.

Traditional attack payloads for offensive security purposes are typically configured to further an attacker's foothold into a computing system or computing network. Consequently, such payloads include and are encumbered by features such as a loadable modules, reconnaissance components, pivoting capabilities, and/or persistence mechanisms. While such features and mechanisms are useful from an attacker's perspective (e.g., for utilization during a red team offensive penetration testing exercise), they are redundant (and not necessary) in the context of merely validating that a target computing system is vulnerable to a given exploit.

What's more, provisioning such "heavyweight" payloads just for vulnerability validation significantly increases development time and computing resources required to test and integrate such a full-featured payload (e.g., for technical reasons). Even more concerning is the fact that such heavyweight vulnerability validation payloads expose a target computing system to substantial security-related risks (e.g., man-in-the-middle attacks, and the like).

Therefore, to ameliorate the foregoing concerns, vulnerability validation engine 110 implements attack payload generator 115 to generate and provision a lightweight payload (e.g., attack payload 130) to perform vulnerability validation on target computing system 135. It will be appreciated that performing vulnerability validation using a lightweight offensive payload like attack payload 130 instead of a traditional heavyweight full-featured payload can reduce the development time for creating new vulnerability content and increase the applicability of vulnerability validation across a wider range of exploits.

As noted, an exploit is a piece of software, chunk of data, or a sequence of commands that takes advantage of a given vulnerability to cause unintended or unanticipated behavior to occur on computer software and/or hardware. Examples of vulnerabilities that can be validated include, but are not limited to, known and unknown cybersecurity vulnerabilities as well as public and non-public cybersecurity vulnerabilities (e.g., cybersecurity vulnerabilities contained in a Common Vulnerabilities and Exposures (CVE) list with CVE entries, a National Vulnerability Database (NVD), and the like).

In certain embodiments, vulnerability validation engine 110 provides a lightweight attack payload 130 configured with a restricted execution scope (and capabilities) to limit at least (1) the impact of attack payload 130 on target computing system 135 (being validated for vulnerabilities) and (2) the value of attack payload 130 from a real attacker's point of view (e.g., an external malicious hacker—not a user of vulnerability validation server), while still maintaining industry standard encryption and validation techniques to avoid leaking or exposing even limited data or information across a potentially hostile network environment.

Example Lightweight Offensive Payload

Figure 2:
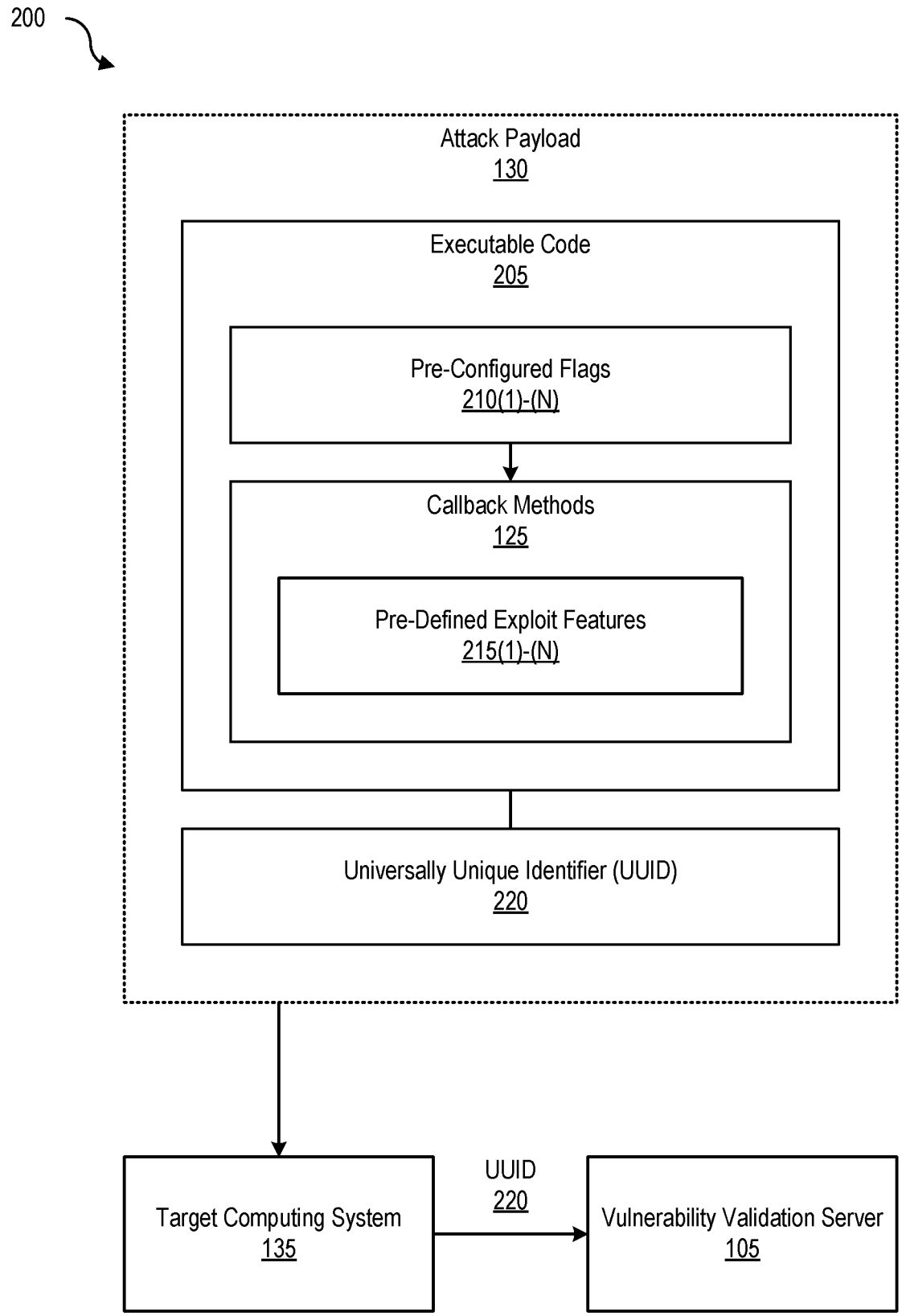
FIG. 2 is a block diagram 200 of a lightweight offensive payload, according to one embodiment of the present disclosure.

FIG. 2 is a block diagram 200 of a lightweight offensive payload (e.g., attack payload 130), according to one embodiment. Attack payload 130 includes at least executable code

205 with pre-configured flags 210(1)-(N) and callback methods 125 as well as a universally unique identifier (UUID) (also called a globally unique identifier (GUID)). Callback methods include at least pre-defined exploit features 215(1)-(N), examples of which are discussed in greater detail with respect to FIG. 3, infra. In this example, UUID 220 is a 128-bit number used to identify information that indicates that a given vulnerability has been validated.

In one embodiment, attack payload generator 115 generates attack payload 130 with executable code 205 and UUID 220 that is limited by an execution scope that includes one or more pre-defined exploit features 215(1)-(N) for validation code execution (e.g., execution of executable code 205 on target computing system 135) associated with vulnerability 150(1). In this example, and as shown in FIG. 2, attack payload 130 is transmitted to target computing system 135 and a confirmation of code execution of executable code 205 based on at least one pre-defined exploit feature of one or more pre-defined exploit features 215(1)-(N) is received (e.g., in the form of UUID 220, among other callback methods), permitting a determination (e.g., by vulnerability validation engine 110) that vulnerability 150(1) has been validated or verified.

In another embodiment, attack payload 130 is generated at vulnerability validation server 105 and includes at least executable code 205 and UUID 220. In this example, attack payload 130 is configured to limit the execution scope of executable code 205 to (one or more of) pre-defined exploit features 215(1)-(N) and to transmit the confirmation of the code execution of executable code 205 to vulnerability validation server 105. As shown in FIG. 2, the confirmation includes UUID 220 and indicates that the code execution is based on at least one pre-defined exploit features (and validates one or more vulnerabilities on target computing system 135).

Examples of Pre-Defined Exploit Features for Vulnerability Validation

Figure 3:
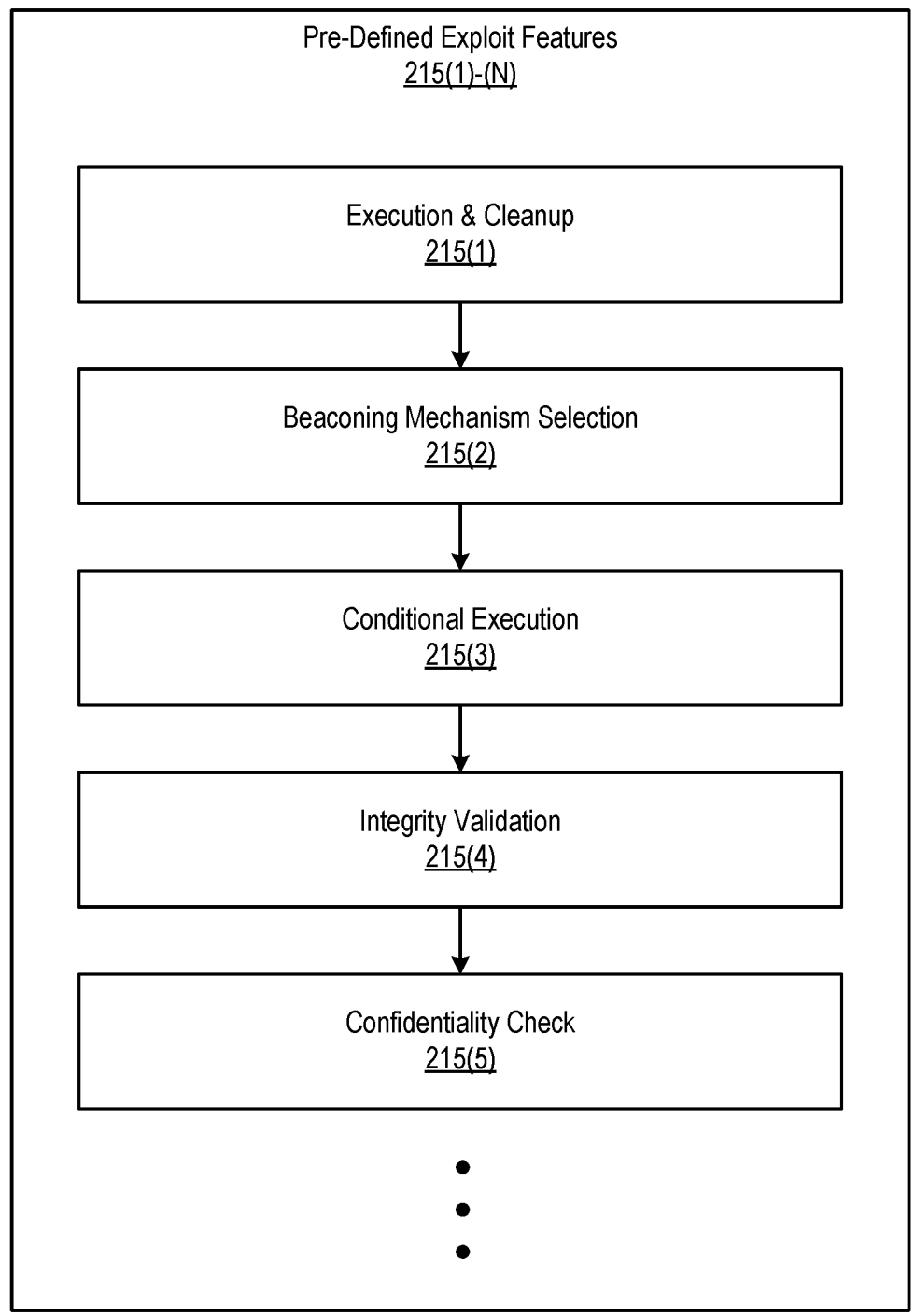
FIG. 3 is a block diagram 300 of pre-defined exploit features, according to one embodiment of the present disclosure.

FIG. 3 is a block diagram 300 of pre-defined exploit features, according to one embodiment. Pre-defined exploit features 215(1)-(N) can be pre-selected, pre-configured, and/or pre-determined (e.g., using an offensive cybersecurity product such as Metasploit Framework, among other options) to purposefully limit the execution scope of execution code 205. Pre-defined exploit features 215(1)-(N) include, but are not limited to, an execution and cleanup 215(1), a beaconing mechanism selection 215(2), a conditional execution 215(3), an integrity validation 215(4), and a confidentiality check 215(5).

In one embodiment, execution and cleanup 215(1) performs an execution and cleanup operation that includes self-deletion and cleanup of attack payload 130 from memory 145 (or disk) of target computing system 135 or execution of attack payload 130 (entirely) from memory 145 (or disk) of target computing system 135. For example, upon executing executable code 205, attack payload 130 can remove itself from disk or memory 145 of target computing system 135.

In some embodiments, beaconing mechanism selection 215(2) performs a selection and beaconing operation that enables secure validation that attack payload 130 has (been) executed on target computing system 135, conditional execution 215(3) performs a conditional execution operation based on (one or more) attributes of target computing system 135 to maintain (and not exceed) the execution scope of attack payload 135.

In other embodiments, integrity validation 215(4) performs a two-way integrity checking operation for cross-validation (e.g., between attack payload 130 once attack payload 130 has been transmitted to target computing system 135 and vulnerability validation server 105) to prevent false-positives and/or man-in-the-middle attacks and confidentiality check 215(5) performs a two-way confidentiality operation that encrypts communications (e.g., between vulnerability validation server 105 and target computing system 135) to prevent false-positives and/or man-in-the-middle attacks. In these examples, a man-in-the-middle attack (MITM) is an attack where a malicious attacker can secretly relay and possibly alter communications between vulnerability validation server 105 and target computing system 135, while surreptitiously causing vulnerability validation server 105 and target computing system 135 to believe that they are communicating with each other (e.g., using active eavesdropping, and the like).

Example of Validating a Vulnerability Using a Lightweight Offensive Payload

In one embodiment, once execution executable code 205 on target computing system 135 has started, attack payload 130 executes pre-configured flags 210(1)-(N) for cessation of execution to prevent execution of executable code 205 on target computing system 135 if discovery of attack payload 130 on target computing system 135 is likely (e.g., if antivirus, incident detection systems (IDS), and other comparable forensic mechanisms and/or systems are present on target computing system 135). In this example, pre-configured flags 210(1)-(N) are placed in memory 145 of target computing system 135 to verify code execution (e.g., executable code 205) on target computing system 135.

In another embodiment, once target computing system 135 passes examination (e.g., attack payload 130 is not likely to be discovered), attack payload 130 executes a pre-programmed set of callback methods (e.g., callback methods 125) to vulnerability validation server 105 using secure channels (e.g., a security support provider (SSP), and the like).

It should be noted that callback methods 125 are configurable at the time of payload creation (e.g., attack payload generator 115 can configure callback methods 125 using feature set engine 120 at the time of creation of attack payload 130, which can be included in protocol-based communications). In the foregoing example, once attack payload 130 creates a (secure) channel to vulnerability validation server 105, attack payload 130 sends back a limited set of data (e.g., UUID 220) proving or verifying that attack payload 130 gained code execution (e.g., of executable code 205) on target computing system 135 (e.g., based on the responsiveness of one or more of pre-configured flags 210(1)-(N) that are part of executable code 205 to one or more of pre-defined exploit features 215(1)-(N)), thus validating (or permitting validation of) a (given) vulnerability (e.g., vulnerability 150(1)) by vulnerability validation server 105.

In certain embodiments, no further exploit vectors (in addition to pre-defined exploit features 215(1)-(N)) are provided in attack payload 130 and the code execution does not facilitate a bidirectional communication channel between target computing system 135 and vulnerability validation server 105. Therefore, once validation of vulnerability 150(1) has been reported by attack payload 130 to vulnerability validation server 105, attack payload 130 ceases execution of executable code 205 and removes itself from the disk and memory of target computing system 135, thus returning target computing system 135 to its original configuration, thereby preventing a future foothold or toolset for a potentially malicious attacker.

In one embodiment, the lightweight characteristics of attack payload 130 (e.g., pre-configured flags 210(1)-(N) and pre-defined exploit features 215(1)-(N)) can make it easier to implement optimized cybersecurity vulnerability validation in resource-constrained computing and networking environments compared to conventional full-featured attack payloads. For example, unlike conventional full-featured attack payloads for vulnerability validation, attack payload 130 does not require a persistent session management mechanism on vulnerability validation server 105, thus enabling greater scalability and parallel validation of vulnerabilities across a target environment (e.g., target computing system 135). In addition, limited pre-defined information (e.g., pre-defined exploit features 215(1)-(N)) reported by attack payload 130 (e.g., using pre-configured flags 210(1)-(N)) limits and significantly curtails the utility of attack payload 130 to be exploited and utilized by malicious actors that may be covertly monitoring the target environment (e.g., target computing system 135).

Example Vulnerability Validation Table

FIG. 4 is a block diagram 400 of a vulnerability validation table 405, according to one embodiment. Vulnerability validation table 405, which can be any form of table, catalogue, or other comparable data structure, is maintained by vulnerability validation server 105 (e.g., for use by vulnerability validation engine 110) and includes at least a target field 410, a vulnerability field 415, a features filed 420, an attack payload field 425, and a UUID field 430. Target field 410 includes the identities of target computing environments with protected hosts that will be subject to vulnerability validation operations in such cybersecurity computing environments (e.g., target computing systems 135(1)-(7)).

In one embodiment, vulnerability field 415 includes one or more vulnerabilities (e.g., on target computing system 135) to be validated by each of attack payloads 130(1)-(7) including, but not limited to, Structured Query Language (SQL) injection, cross-site scripting (XSS), insecure direct object references, cross-site request forgery, insecure cryptographic (hash) storage, failure to restrict Uniform Resource Locator (URL) access, unvalidated redirects and forwards, and the like. Examples of other cybersecurity vulnerabilities that can be validated or verified by attack payloads 130(1)-(7) can include known and public cybersecurity vulnerabilities (e.g., retrieved from sources such as a CVE list, a NVD, and the like, and populated in vulnerability validation table 405 by vulnerability validation engine 110).

In another embodiment, features field 420 includes various combinations of pre-defined exploit features for each vulnerability validation operation for which an attack payload identified in attack payload field 425 is generated. By using a combination of pre-defined exploit features, each of attack payloads 130(1)-(7) that correspond with each of target computing systems 135(1)-(7) can be customized for lightweight operation by including only those pre-defined exploit features that are necessary for vulnerability validation. Finally, UUID field 430 includes UUIDs 220(1)-(7) (e.g., 128-bit (16 byte) numbers, which in certain embodiments, can be encoded in various protocols for obfuscation) for corresponding attack payloads 130(1)-(7), each of which is (potentially) transmitted (back) from a target computing environment to a vulnerability validation server—if and when successful vulnerability validation occurs, without requiring a persistent session management mechanism on the vulnerability validation server.

Examples of Encoding UUIDs in Protocols for Lightweight Attack Payloads

In certain embodiments, vulnerability validation engine 110 encodes a UUID into one or more protocols (e.g., network protocols, communication protocols, routing protocols, and the like) that are used to transmit attack payload 130 from vulnerability validation server 105 to target computing system 135. In these examples, a (given) UUID, which is at least a 16 byte value, can be encoded into the one or more protocols as part of the vulnerability validation process (e.g., as part of generating attack payload 130).

For example, a UUID is encoded into one or more protocols associated with an offensive security and/or penetration testing mechanism in a manner that does not require raw sockets. Conventional full-featured payloads facilitate communication over a stager socket (e.g., Meterpreter, which is an advanced, dynamically extensible payload that uses in-memory Dynamic Link Library (DLL) injection stagers and is extended over a network at runtime). However, vulnerability validation engine 110 encodes (or hides) a UUID in a protocol in a manner that does not implicate the use of raw sockets (thus, preventing vulnerability validation server 105 from being encumbered with persistent session management).

In one embodiment, vulnerability validation engine 110 encodes a UUID in a username of Simple Mail Transfer Protocol (SMTP). For example, vulnerability validation engine 110 can split the UUID between an address and a body of an email sent as attack payload 130 using SMTP from vulnerability validation server 105 to target computing system 135. In another embodiment, vulnerability validation engine 110 uses User Datagram Protocol (UDP) to transmit attack payload 130 from vulnerability validation engine 110 to target computing system 135 because UDP does not require raw socks (e.g., does not require a privileged listener or sender).

In some embodiments, vulnerability validation engine 110 embeds a UUID as part of a name of a string that is advertised using Multicast Dynamic Name System (mDNS). As part of the embedding process, a checksum can be performed as part of an identifier field to verify the UUID. In other embodiments, vulnerability validation engine 110 generates a random Internet Protocol version 6 (IPv6) address, splits a UUID into two 8 byte values, and appends each 8 byte part using a redirect mechanism that is part of IPv6 (e.g., appending each 8 byte part of the UUID to where communication is received from, and where the communication is going to).

In other embodiments, vulnerability validation engine 110 embeds, encodes, or obfuscates a UUID in a Real-Time Protocol (RTP) packet, an Address Resolution Protocol (ARP) packet, or a Cisco Discovery Protocol (CDP) packet. In one embodiment, vulnerability validation engine 110 uses a random byte field in a Secure Sockets Layer (SSL) session (e.g., by using the random bytes (e.g., timestamps) that are sent back and forth between a server and a client as part of a "hello" message). Therefore, in this example, vulnerability validation engine 110 embeds the UUID in a SSL handshake.

In certain embodiments, vulnerability validation engine 110 encodes a UUID directly into an Internet Protocol (IP) address that is resolved (without the use of a DNS server). For example, PowerDNS, which is a type of DNS server, can be communicatively coupled to an attack payload database (not shown in FIG. 1) and when a DNS entry associated with a hostname is received, the UUID can be looked up and pushed to the attack payload database. In this example, the UUID can also be encoded in the hostname that is queried.

In some embodiments, vulnerability validation engine 110 listens for Server Message Block (SMB) connections and inserts a UUID as a username (e.g., in a standard SMB authentication scenario). In this example, an SMB client or a SMB server that is controlled by vulnerability validation server 105 (and that is authenticated against by the SMB client) can be used for UUID encoding and obfuscation.

In one embodiment, if more than 16 bytes are required for a UUID, vulnerability validation engine 110 uses a hashing algorithm (e.g., a Secure Hashing Algorithm (SHA), a Message Digest (MD) Algorithm, and the like) that generates a uniquely hash-able name that hashes back to an original name. Therefore, because vulnerability validation engine 110 exclusively controls which UUIDs are generated (and how they are generated and maintained), vulnerability validation engine 110 can also control which hashable names are generated (and the format in which they are generated). For example, vulnerability validation engine 110 can generate hashable names that do not collide when they are generated back to UUID hashes. In another embodiment, a UUID can also be transmitted (e.g., from vulnerability validation server 105 to target computing system 135) as a hashed password (e.g., because vulnerability validation engine 110 has and controls the UUID, the UUID can be successfully reversed).

In certain embodiments, vulnerability validation engine 110 generates a single dedicated UUID per attack payload (e.g., as shown in vulnerability validation table 405 of FIG. 4) and configures the attack payload to proxy back to an offensive security and/or penetration testing mechanism with connectivity information (e.g., using a proxy mechanism to perform listening and other tasks that typically require raw sockets). In this manner, vulnerability validation engine 110 can provision, embed, and encode UUIDs for vulnerability validation without having to pivot a session and without having to push packets over a network.

Figure 5:
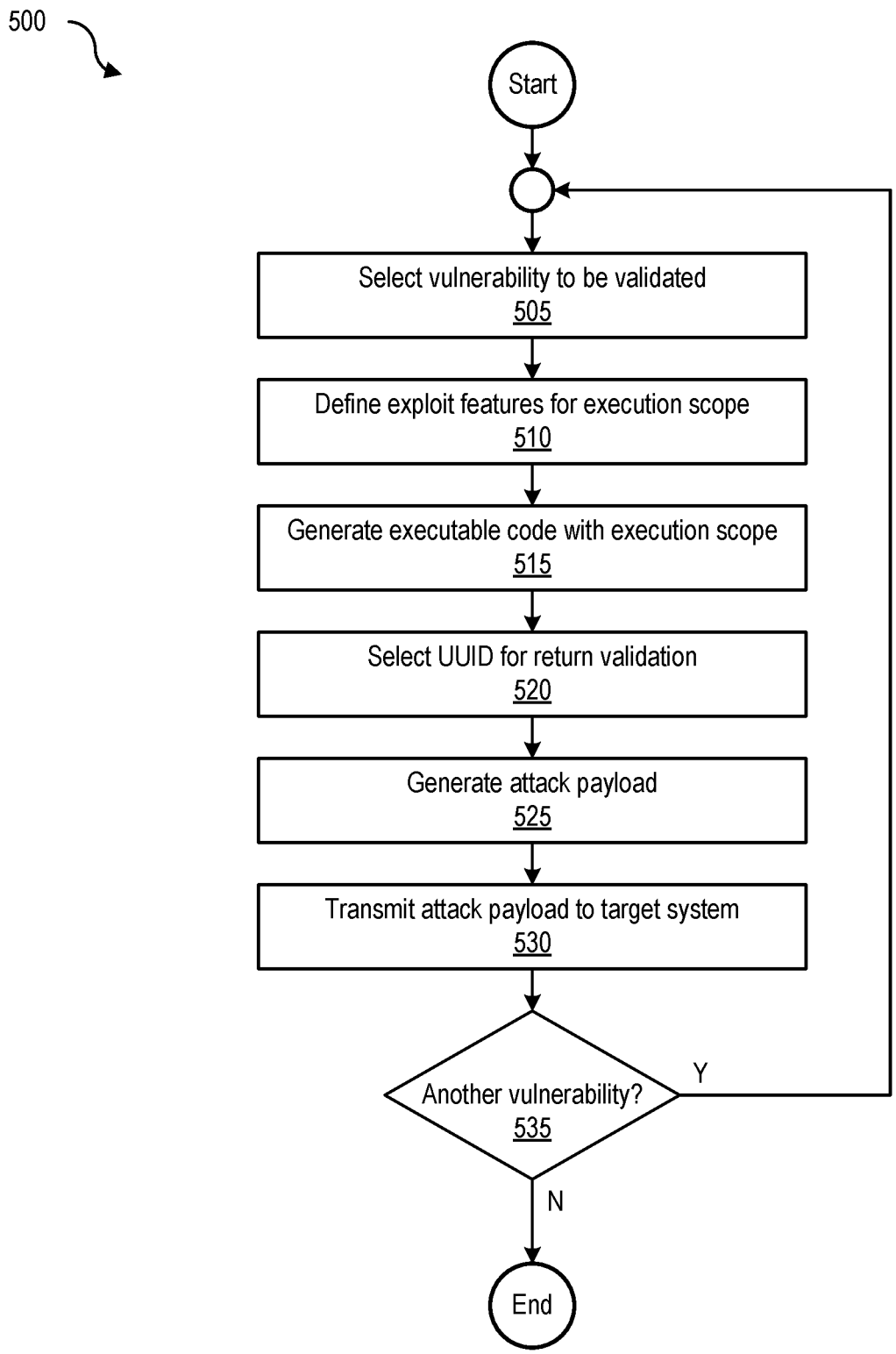
FIG. 5 is a flowchart 500 of a process to transmit an attack payload to a target system, according to one embodiment of the present disclosure.

Example Processes for Vulnerability Validation Using Lightweight Offensive Payloads FIG. 5 is a flowchart 500 of a process to transmit an attack payload to a target system, according to one embodiment. The process begins at 505 by selecting a vulnerability to be validated (e.g., SQL injection, XSS, insecure direct object references, cross-site request forgery, insecure cryptographic storage, failure to restrict URL access, unvalidated redirects and forwards, and the like) by vulnerability validation server 105. At 510, the process defines exploit features (e.g., one or more of pre-defined exploit features 215(1)-(N) for (limiting the) execution scope (of an attack payload on target computing system 135).

At 515, the process generates executable code (e.g., executable code 205) with the execution scope (of the executable code limited by the one or more pre-defined exploit features 215(1)-(N)), and at 220, selects a UUID for return validation (e.g., from target computing system 135 to vulnerability validation server 105). As noted, the UUID can be embedded or encoded in one or more protocols by vulnerability validation engine 110 as part of being transmitted to target computing system 135 in an attack payload. Examples of pre-defined exploit features that can define an execution scope and limit an attack payload include execution and cleanup, beaconing, conditional execution, integrity validation, and confidentiality check, among others.

At 525, the process generates (and configures) an attack payload (e.g., a lightweight offensive payload like attack payload 130 using attack payload generator 115 as shown in FIG. 1), and at 530, transmits (or sends) the attack payload to a target system (e.g., to target computing system 135 via network 155). At 535, the process determines if there is another (cybersecurity) vulnerability. If there is another vulnerability (to validate, authenticate, or verify), the process loops to 505. Otherwise, the process ends.

Figure 6:
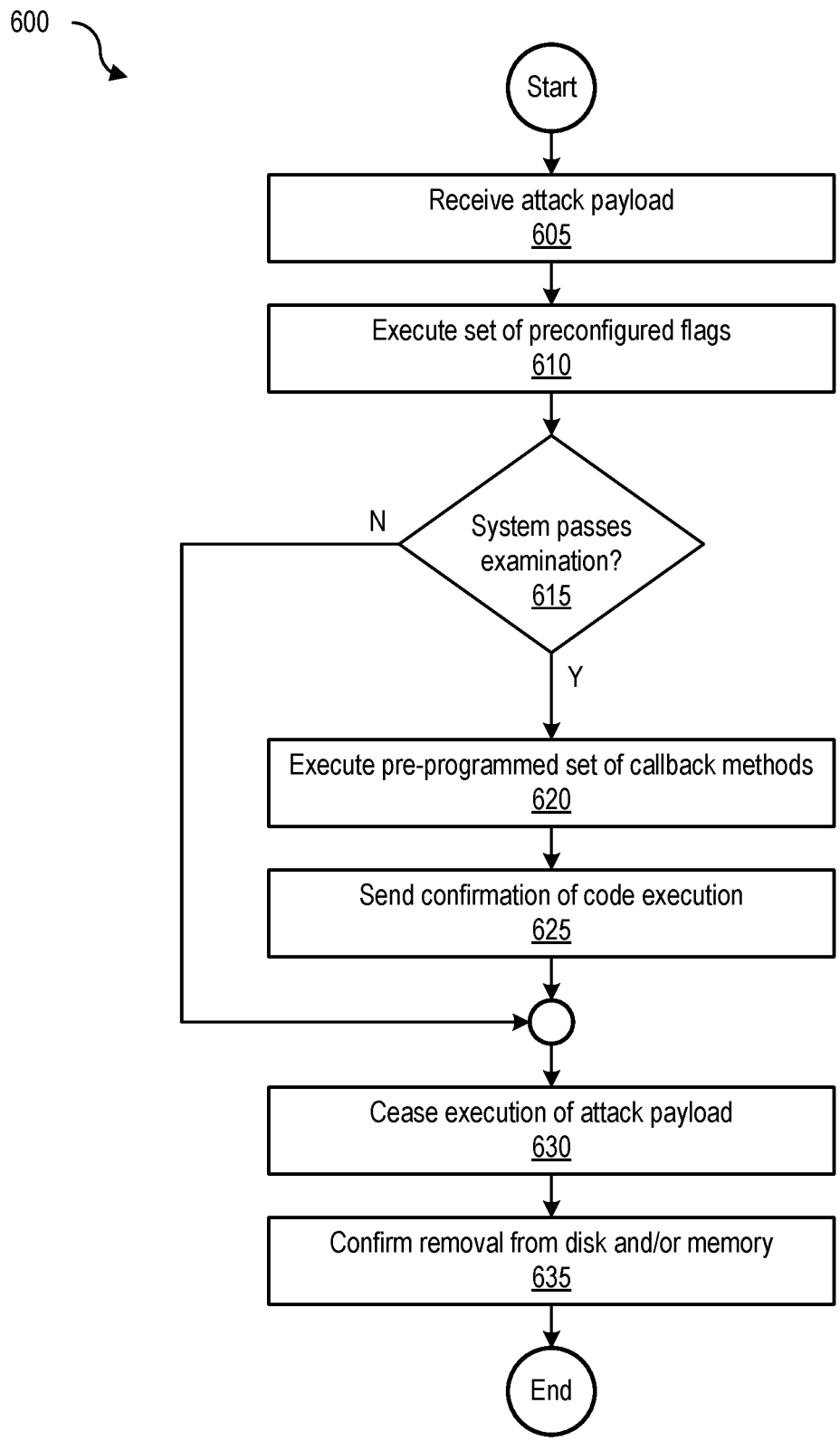
FIG. 6 is a flowchart 600 of a process to execute a lightweight offensive payload based on pre-defined exploit features, according to one embodiment of the present disclosure.

FIG. 6 is a flowchart 600 of a process to execute a lightweight offensive payload based on pre-defined exploit features, according to one embodiment. The process begins at 605 by receiving an attack payload (e.g., attack payload 130 in memory 145 of target computing system 135 as shown in FIG. 1). At 610, the process executes a set of preconfigured flags (e.g., pre-configured flags 210(1)-(N) for cessation of execution and prevent execution in target computing environments where discovery is likely, for example, because of antivirus or incident detection provisions, and the like).

At 615, the process determines if the system passes examination (e.g., if execution of the executable code in the attack payload can be performed without discovery). If the system passes examination, the process, at 620, executes a pre-programmed set of callback methods (e.g., callback methods 125), and at 625, sends confirmation of code execution (e.g., to vulnerability validation server 105 in the form of UUID 220 as shown in FIG. 2). At 630, the process ceases execution of the attack payload (e.g., by removing attack payload 130 from memory 145) and ends at 635 by confirming removal (of the attack payload) from disk and/or memory (e.g., of target computing system 135).

Figure 7:
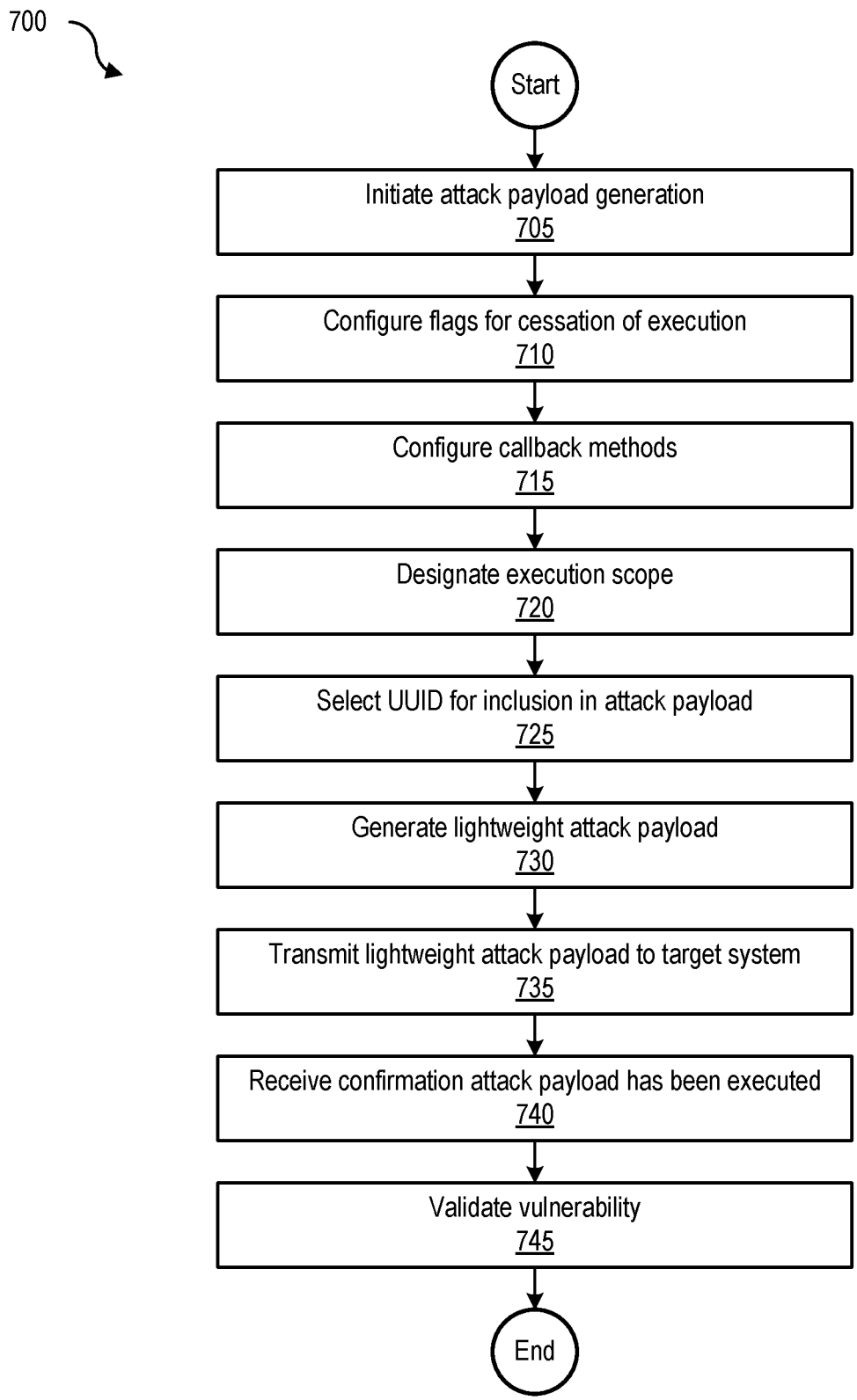
FIG. 7 is a flowchart 700 of a process to validate a vulnerability using a lightweight offensive payload, according to one embodiment of the present disclosure.

FIG. 7 is a flowchart 700 of a process to validate a vulnerability using a lightweight offensive payload, according to one embodiment. The process begins at 705 by initiating attack payload generation (e.g., using attack payload generator 115), and at 710, configures flags for cessation of execution (e.g., pre-configured flags 210(1)-(N)). At 715, the process configures callback methods (e.g., pre-defined exploit features 215(1)-(N)), and at 720, designates an execution scope. At 725, the process selects a UUID for inclusion in the attack payload (e.g., UUID 220). At 730, the process generates a lightweight attack payload (e.g., attack payload 130), and at 735, transmits the lightweight attack payload to a target system (e.g., target computing system 135). At 740, the process receives confirmation that the attack payload has been executed (with a limited execution scope), and ends at 745 by validating the vulnerability.

Therefore, the methods, systems, and processes disclosed herein validate vulnerabilities using real and/or live exploits in a controlled, efficient, and/or optimized manner that prevents security-related risks during the vulnerability validation process by circumventing the need for raw sockets and persistent session management.

Example Computing Environment

Figure 8:
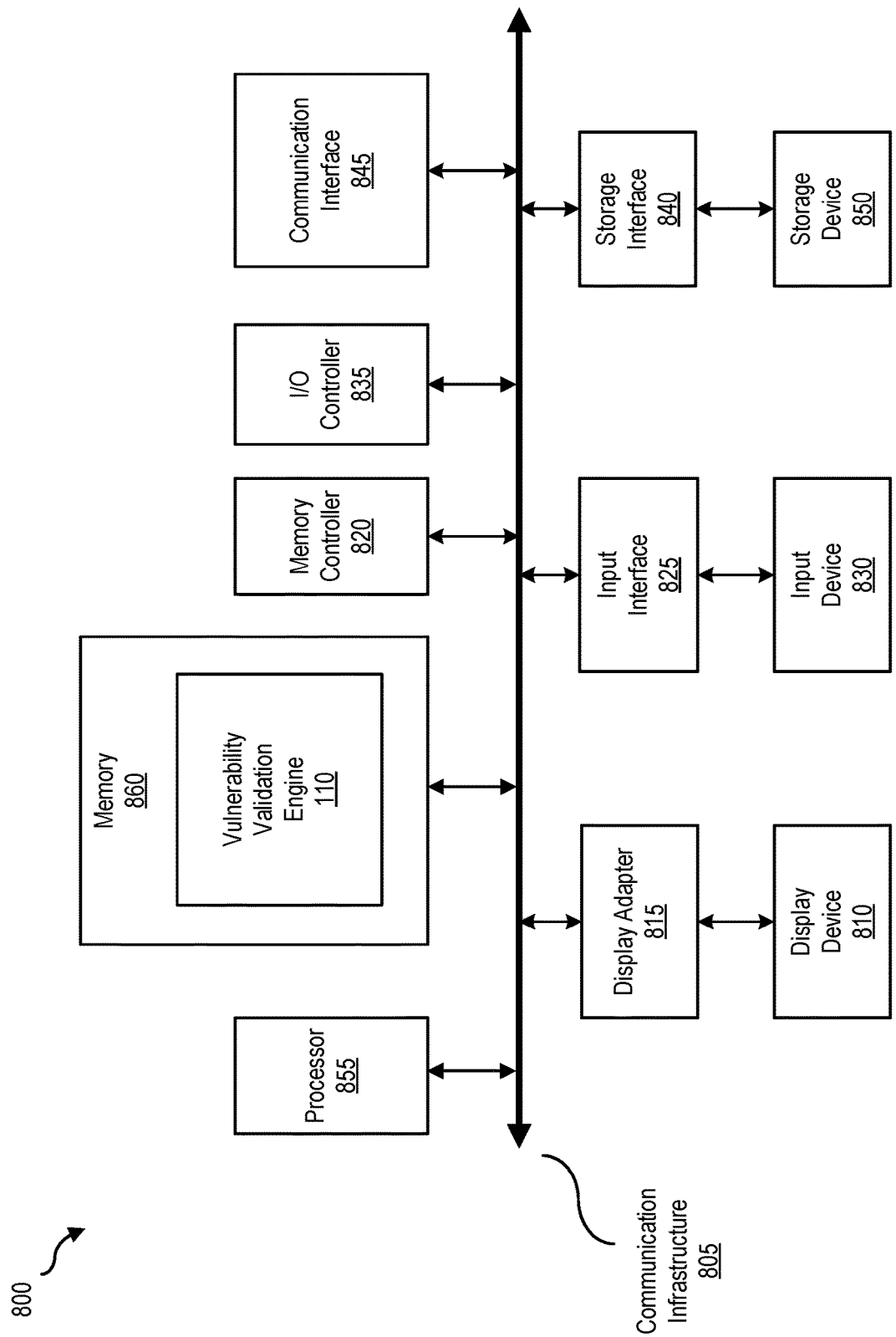
FIG. 8 is a block diagram 800 of a computing system, illustrating a vulnerability validation engine implemented in software, according to one embodiment of the present disclosure.

FIG. 8 is a block diagram 800 of a computing system, illustrating how a vulnerability validation engine 110 can be implemented in software, according to one embodiment. Computing system 800 can include vulnerability management server 105 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes vulnerability validation engine 110, computing system 800 becomes a special purpose computing device that is configured to validate vulnerabilities using lightweight offensive payloads.

Processor 855 generally represents any type or form of processing unit capable of processing data or interpreting and executing instructions. In certain embodiments, processor 855 may receive instructions from a software application or module that may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 800 may include both a volatile memory unit and a non-volatile storage device. In one example, program instructions implementing vulnerability validation engine 110 may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805, and may perform and/or be a means for performing, either alone or in combination with other elements, one or more of the operations or features described and/or illustrated herein. I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type/form of communication device/adapter capable of facilitating communication between computing system 800 and other devices and may facilitate communication between computing system 800 and a private or public network. Examples of communication interface 845 include, a wired network interface (e.g., network interface card), a wireless network interface (e.g., a wireless network interface card), a modem, and any other suitable interface. Communication interface 845 may provide a direct connection to a remote server via a direct link to a network, such as the Internet, and may also indirectly provide such a connection through, for example, a local area network. Communication interface 845 may also represent a host adapter configured to facilitate communication between computing system 800 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 800 may also include at least one display device 810 coupled to communication infrastructure 805 via a display adapter 815 that generally represents any type or form of device capable of visually displaying information forwarded by display adapter 815. Display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of storage device 850. When executed by processor 855, a computer program loaded into computing system 800 may cause processor 855 to perform and/or be a means for performing the functions of one or more of the embodiments described/illustrated herein. Alternatively, one or more of the embodiments described and/or illustrated herein may be implemented in firmware and/or hardware.

Example Networking Environment

Figure 9:
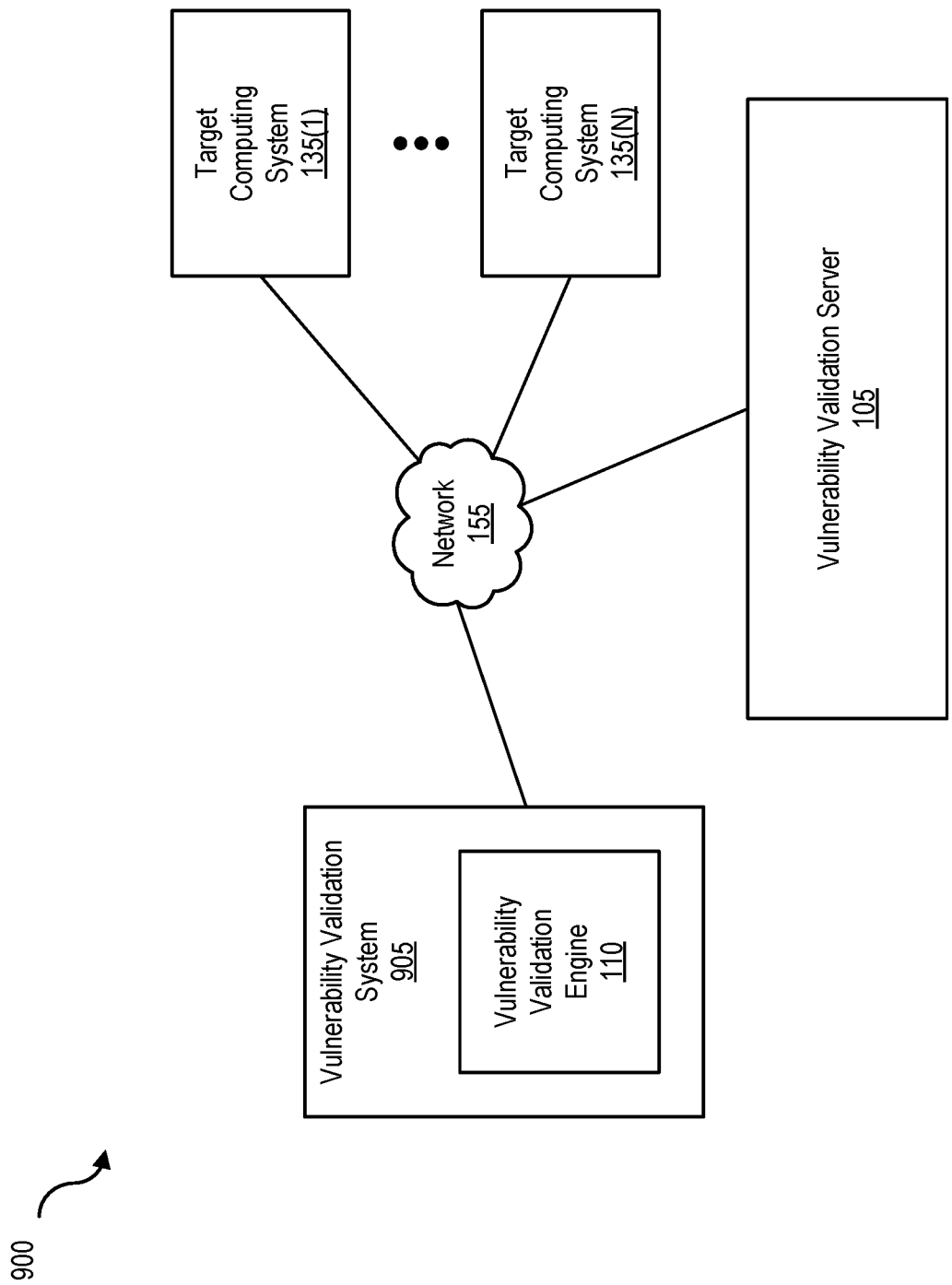
FIG. 9 is a block diagram 900 of a networked system, illustrating how various devices can communicate via a network, according to one embodiment of the present disclosure.

FIG. 9 is a block diagram of a networked system, illustrating how various computing devices can communicate via a network, according to one embodiment. Network 155 generally represents any type or form of computer network or architecture capable of facilitating communication between vulnerability validation server 105 and target computing system 135. For example, network 155 can be a Wide Area Network (WAN) (e.g., the Internet) or a Local Area Network (LAN). In certain embodiments, a communication interface, such as communication interface 845 in FIG. 8, may be used to provide connectivity between vulnerability validation server 105 and target computing system 135, and network 155.

Vulnerability validation engine 110 may be part of vulnerability validation server 105, or may be separate. If separate, vulnerability validation system 905 and vulnerability validation server 105 may be communicatively coupled via network 155. All or a portion of embodiments may be encoded as a computer program and loaded onto and executed by vulnerability validation system 905 and/or vulnerability validation server 105, and may be stored on vulnerability validation system 905 and/or vulnerability validation server 105, and distributed over network 155.

In some examples, all or a portion of vulnerability validation system 905 and/or vulnerability validation server 105 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. The embodiments described and/or illustrated herein are not limited to the Internet or any particular network-based environment.

Various functions described herein may be provided through a remote desktop environment or any other cloud-based computing environment. In addition, one or more of the components described herein may transform data, physical devices, and/or representations of physical devices from one form to another. For example, vulnerability validation engine 110 may transform the behavior of vulnerability validation system 905 and/or vulnerability validation server 105 to perform vulnerability validation using lightweight offensive payloads.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
generating an attack payload for a target computing system, wherein
the attack payload comprises executable code configured to:
execute one or more exploit features on the target computing system to test for a vulnerability on the target computing system, the execution limited by an execution scope,
return a universally unique identifier (UUID) if the vulnerability is validated based on the execution, the UUID being unique to the attack payload, and
remove the attack payload from the target computing system after the validation;
transmitting the attack payload to the target computing system;
receiving the UUID from the attack payload; and
determining, based on the UUID, that the vulnerability is validated.

2. The computer-implemented method of claim 1, wherein
the attack payload is generated at a vulnerability validation server and received by the vulnerability validation server.

3. The computer-implemented method of claim 2, further comprising the vulnerability validation server:
selecting the vulnerability to test from a plurality of vulnerabilities;
determining the execution scope and the one or more exploit features based on the vulnerability; and
generating the executable code for the one or more exploit features and based on the execution scope.

4. The computer-implemented method of claim 3, further comprising the vulnerability validation server: generating the UUID and including the UUID in the attack payload.

5. The computer-implemented method of claim 3, further comprising the vulnerability validation server:
generating a hashed value as the UUID, wherein the value hashed is selected to not collide with other UUIDs generated for other attack payloads; and
reversing the hashed value after the UUID is received from the target computing system.

6. The computer-implemented method of claim 2, further comprising the vulnerability validation server:
generating UUIDs for a plurality of attack payloads to be transmitted to a plurality of target computers; and
maintaining the UUIDs in a vulnerability validation table.

7. The computer-implemented method of claim 2, wherein
the executable code is configured to: return the UUID to the vulnerability validation server over a secure channel.

8. The computer-implemented method of claim 2, further comprising the vulnerability validation server: transmitting the UUID to the target computing system without using a socket connection to the target computing system.

9. The computer-implemented method of claim 8, wherein
the UUID is transmitted to the target computing system via a Simple Mail Transfer Protocol (SMTP) or a User Datagram Protocol (UDP).

10. The computer-implemented method of claim 8, wherein the executable code is configured to:
   examine the target computing system to determine whether discovery of the exploit features is likely; and
   cease execution in response to a determination that discovery of the one or more exploit features is likely.

11. A system comprising:
   one or more computing devices that implement a vulnerability validation server, configured to:
   generate an attack payload for a target computing system, wherein the attack payload comprises executable code configured to:
      execute one or more exploit features on the target computing system to test for a vulnerability on the target computing system, the execution limited by an execution scope,
      return a universally unique identifier (UUID) if the vulnerability is validated based on the execution, the UUID being unique to the attack payload, and
      remove the attack payload from the target computing system after the validation;
   transmit the attack payload to the target computing system;
   receive the UUID from the attack payload; and
   determine, based on the UUID, that the vulnerability is validated.

12. The system of claim 11, wherein the vulnerability validation server is configured to:
   select the vulnerability to test from a plurality of vulnerabilities;
   determine the execution scope and the one or more exploit features based on the vulnerability; and
   generate the executable code for the one or more exploit features and based on the execution scope.

13. The system of claim 12, wherein the vulnerability validation server is configured to:
   generate the UUID and include the UUID in the attack payload.

14. The system of claim 12, wherein the vulnerability validation server is configured to:
   generate a hashed value as the UUID, wherein the value hashed is selected to not collide with other UUIDs generated for other attack payloads; and
   reverse the hashed value after the UUID is received from the target computing system.

15. The system of claim 11, wherein the vulnerability validation server is configured to:
   generate UUIDs for a plurality of attack payloads to be transmitted to a plurality of target computers; and
   maintain the UUIDs in a vulnerability validation table.

16. The system of claim 11, wherein the vulnerability validation server is configured to:
   transmit the UUID to the target computing system without using a socket connection to the target computing system.

17. The system of claim 11, wherein the vulnerability validation server is configured to:
   receive the UUID over a secure channel.

18. The system of claim 11, wherein the executable code is configured to:
   examine the target computing system to determine whether discovery of the one or more exploit features is likely; and
   cease execution in response to a determination that discovery of the one or more exploit features is likely.

19. One or more non-transitory computer-readable media storing program instructions that when executed on one or more processors implement a vulnerability validation server and cause the vulnerability validation server to:
   generate an attack payload for a target computing system, wherein the attack payload comprises executable code configured to:
      execute one or more exploit features on the target computing system to test for a vulnerability on the target computing system, the execution limited by an execution scope,
      return a universally unique identifier (UUID) if the vulnerability is validated based on the execution, the UUID being unique to the attack payload, and
      remove the attack payload from the target computing system after the validation;
   transmit the attack payload to the target computing system;
   receive the UUID from the attack payload; and
   determine, based on the UUID, that the vulnerability is validated.

20. The one or more non-transitory computer-readable media of claim 19, wherein
   the program instructions when executed on the one or more processors cause the vulnerability validation server to:
   select the vulnerability to test from a plurality of vulnerabilities;
   determine the execution scope and the one or more exploit features based on the vulnerability; and
   generate the executable code for the one or more exploit features and based on the execution scope.

* * * * *